(12) United States Patent
Wong et al.

(10) Patent No.: US 7,213,240 B2
(45) Date of Patent: May 1, 2007

(54) PLATFORM-INDEPENDENT SELECTIVE AHEAD-OF-TIME COMPILATION

(75) Inventors: Hinkmond Wong, Sunnyvale, CA (US); Nedim Fresko, San Francisco, CA (US); Mark Lam, Milpitas, CA (US)

(73) Assignee: Sun Microsystems, Inc., Menlo Park, CA (US)

( * ) Notice: Subject to any disclaimer, the term of this patent is extended or adjusted under 35 U.S.C. 154(b) by 348 days.

(21) Appl. No.: 09/970,661

(22) Filed: Oct. 5, 2001

(65) Prior Publication Data

US 2003/0070161 A1   Apr. 10, 2003

(51) Int. Cl.
*G06F 9/45* (2006.01)
(52) U.S. Cl. .................................... 717/148
(58) Field of Classification Search ............... 717/139, 717/146–148, 151, 153, 154; 706/52
See application file for complete search history.

(56) References Cited

U.S. PATENT DOCUMENTS

| | | | |
|---|---|---|---|
| 4,638,298 A | | 1/1987 | Spiro |
| 5,276,881 A | | 1/1994 | Chan et al. |
| 5,280,613 A | | 1/1994 | Chan et al. |
| 5,339,419 A | | 8/1994 | Chan et al. |
| 5,812,854 A | * | 9/1998 | Steinmetz et al. .......... 717/159 |
| 5,920,720 A | * | 7/1999 | Toutonghi et al. .......... 717/148 |
| 5,966,542 A | | 10/1999 | Tock |
| 5,966,702 A | | 10/1999 | Fresko et al. |
| 6,081,665 A | * | 6/2000 | Nilsen et al. ............... 717/116 |
| 6,110,226 A | | 8/2000 | Bothner |
| 6,158,048 A | | 12/2000 | Luch et al. |
| 6,289,506 B1 | * | 9/2001 | Kwong et al. .............. 717/148 |

OTHER PUBLICATIONS

Andrew P. Black, "Supporting Distributed Applications: Experience with Eden", Department of Computer Science, University of Washington, Technical Report 85-03-02, Mar. 1985, pp. 1-21.
Andrew P. Black, "The Eden Programming Language", Department of Computer Science, FR-35, University of Washington, Technical Report 85-09-01, Sep. 1985 (Revised, Dec. 1985), pp. 1-19.

(Continued)

*Primary Examiner*—Tuan Dam
*Assistant Examiner*—Andre R Fowlkes
(74) *Attorney, Agent, or Firm*—Finnegan, Henderson, Farabow, Garrett & Dunner LLP

(57) ABSTRACT

Methods and systems for platform-independent selective ahead-of-time compilation are herein described. A method selector comprising a profiling tool and heuristic selects a subset of methods for ahead-of-time compilation. The profiling tool ranks a set of methods according to predetermined criteria, and the heuristic identifies the subset of methods from the set of methods. An ahead-of-time compiler comprises a first unit and a second unit. The first unit converts, for each selected method, bytecodes corresponding to the selected method to a platform-independent intermediate representation. The second unit optimizes the platform-independent intermediate representation of each selected method, wherein each optimized intermediate representation is stored with a corresponding selected method. A virtual machine on a device converts an optimized intermediate representation associated with a selected method loaded onto the device to platform-dependent machine code.

60 Claims, 10 Drawing Sheets

OTHER PUBLICATIONS

Andrew P. Black, "The Eden Project: Overview and Experiences", Department of Computer Science, University of Washington, EUUG, Autumn '86 Conference Proceedings, Manchester, UK, Sep. 22-25, 1986, pp. 177-189.

Andrew P. Black, Edward D. Lazowska, Jerre D. Noe and Jan Sanislo, "The Eden Project: A Final Report", Department of Computer Science, University of Washington, Technical Report 86-11-01, Nov. 1986, pp. 1-28.

Calton Pu, "Replication and Nested Transactions in the Eden Distributed System", Doctoral Dissertation, University of Washington, Aug. 6, 1986, pp. 1-179 (1 page Vita).

USPTO Office Action mailed Aug. 16, 2004 in related U.S. Appl. No. 10/455,341.

* cited by examiner

PLATFORM-INDEPENDENT SELECTIVE AHEAD-OF-TIME COMPILATION

RELATED APPLICATIONS

The following identified U.S. patent applications are relied upon and are incorporated by reference in this application.

U.S. patent application Ser. No. 09/131,686, entitled "METHOD AND SYSTEM FOR LOADING CLASSES IN READ-ONLY MEMORY," filed Aug. 10, 1998, now U.S. Pat. No. 5,966,542.

FIELD OF THE INVENTION

The present invention relates generally to data processing systems and, more particularly, to platform-independent selective ahead-of-time compilation.

BACKGROUND AND MATERIAL INFORMATION

In today's society, the Internet has become an important medium for information exchange. Although the Internet is now very popular among the general public, it initially began as a system (or network) of interconnected computers used by government and academic researchers. An early problem of this network stemmed from the fact that the interconnected computers were not the same; they employed different hardware as well as different operating systems. Information exchange on such a heterogeneous network posed a communication problem. This problem was resolved through agreement on common standards, including protocols such as Transmission Control Protocol/Internet Protocol (TCP/IP) and HyperText Transfer Protocol (HTTP). These protocols enabled varied interconnected machines to share information in the form of static text or graphic documents.

These protocols, however, represented only two steps in the evolution of the Internet. Although users can exchange information documents among varied computers connected to the Internet, they cannot exchange executable application programs written in conventional languages such as C or C++, which are designed to interface with a particular processor (e.g., the Intel Pentium™ processor) and/or a particular operating system (e.g., Windows 95™ or DOS). This problem was solved with the advent of the Java™ programming language and its related runtime system.

Java is an object-oriented programming language that is described, for example, in a text entitled "The Java™ Tutorial" by Mary Campione and Kathy Walrath, Addison-Wesley, 1996. Importantly, Java is an interpreted language that is platform-independent-that is, its utility is not limited to one particular computer system. Using the Java programming language, a software developer writes programs in a form commonly called Java source code. When the developer completes authoring the program, he then compiles it with a Java compiler into an intermediate form called bytecode. Both the Java source code and the bytecode are platform-independent.

The compiled bytecode can then be executed on any computer system that employs a compatible runtime system that includes a virtual machine (VM), such as the Java virtual machine described in a text entitled "The Java Virtual Machine Specification," by Tim Lindholm and Frank Yellin, Addison Wesley, 1996. The Java VM acts as an interpreter between the bytecode and the particular computer system being used. By use of platform-independent bytecode and the Java VM, a program written in the Java language can be executed on any computer system. This is particularly useful in networks such as the Internet that interconnect heterogeneous computer systems.

Interpreting bytecodes, however, make Java programs many times slower than comparable C or C++ programs. One approach to improving this performance is just-in-time (JIT) compilers. A JIT compiler is a compiler running as part of a Java virtual machine that dynamically translates bytecode to machine code just before a method is first executed. This can provide substantial speed-up over a system that just interprets bytecodes. A JIT compilation typically consists of a few phases executed in the following order: 1) byte-codes are converted to a platform-independent intermediate representation (IR); 2) the IR is transformed to an optimized IR using compiler optimization techniques; 3) the IR is converted to platform-dependent machine code.

Java virtual machine implementations are becoming very popular on devices with limited CPU and memory resources. On such devices, the above JIT compilation process has a few drawbacks. For example, the memory requirements of the compilation process may be prohibitive, because each of the stages has runtime memory requirements which may be excessive on a limited-resource device. Also, the memory requirements of storing each method's translation may be prohibitive. Therefore, JIT's on such devices will have to make decisions on which methods are really worthy of compilation, and will have to handle only those. In addition, some translations will have to be discarded to make room for new ones. This results in slower execution because re-translating is costly.

Another drawback is that runtime handling of byte-code to IR transformation and IR optimization may result in large compiler code sizes. Dynamic method selection online is also costly in terms of compiler code size.

Yet another drawback is that due to lower processing power on a limited resource machine, the optimization phase cannot do much work without slowing down user program execution considerably.

Accordingly, there is a need for a system and method for byte code compilation that is less memory intensive, results in faster compilation and execution, and reduces re-compilation cost.

SUMMARY OF THE INVENTION

Methods and systems consistent with the principles of the invention enable platform-independent selective ahead-of-time compilation. A method selector selects a subset of methods for ahead-of-time compilation. An ahead-of-time compiler comprises a first unit and a second unit. The first unit converts, for each selected method, bytecodes corresponding to the selected method to a platform-independent intermediate representation. The second unit optimizes the platform-independent intermediate representation of each selected method, wherein each optimized intermediate representation is stored as one of a field of a corresponding method descriptor data structure and an attribute of the corresponding method descriptor data structure.

Other methods and systems consistent with the principles of the invention enable platform-independent selective ahead-of-time compilation. A method selector comprising a profiling tool and heuristic selects a subset of methods for ahead-of-time compilation. The profiling tool ranks a set of methods according to predetermined criteria, and the heuristic identifies the subset of methods from the set of methods. An ahead-of-time compiler comprises a first unit and a second unit. The first unit converts, for each selected method, bytecodes corresponding to the selected method to a platform-independent intermediate representation. The second unit optimizes the platform-independent intermediate representation of each selected method, wherein each optimized intermediate representation is stored with a corresponding selected method.

Other methods and systems consistent with the principles of the invention also enable platform-independent selective ahead-of-time compilation. A method selector comprising a profiling tool and heuristic selects a subset of methods for ahead-of-time compilation. The profiling tool ranks a set of methods according to predetermined criteria, and the heuristic identifies the subset of methods from the set of methods. An ahead-of-time compiler comprises a first unit and a second unit. The first unit converts, for each selected method, bytecodes corresponding to the selected method to a platform-independent intermediate representation. The second unit optimizes the platform-independent intermediate representation of each selected method, wherein each optimized intermediate representation is stored with a corresponding selected method. A class preloader may load, prior to runtime, at least one of the selected methods onto a device for execution. A dynamic class loader may load, during runtime, at least one of the selected methods onto the device for execution. A virtual machine on the device may receive at least one method from one of the class preloader and dynamic class loader. An interpreter accesses a method descriptor data structure of a method about to be called, and determines whether the method descriptor data structure has an optimized platform-independent intermediate representation associated with it. A just-in-time compiler converts the optimized intermediate representation associated with the method about to be called to platform-dependent machine code based on a determination that the method descriptor data structure has an optimized platform-independent intermediate representation associated with it.

Other methods and systems consistent with the principles of the invention also enable platform-independent selective ahead-of-time compilation. A method selector selects a subset of methods for ahead-of-time compilation. An ahead-of-time compiler comprises a first unit and a second unit. The first unit converts, for each selected method, bytecodes corresponding to the selected method to a platform-independent intermediate representation. The second unit optimizes the platform-independent intermediate representation of each selected method, wherein each optimized intermediate representation is stored as one of a field of a corresponding method descriptor data structure and an attribute of the corresponding method descriptor data structure. A class preloader may load, prior to runtime, at least one of the selected methods onto a device for execution. A dynamic class loader may load, during runtime, at least one of the selected methods onto the device for execution. A virtual machine on the device may receive at least one method from one of the class preloader and dynamic class loader. An interpreter accesses a method descriptor data structure of a method about to be called, and determines whether the method descriptor data structure has an optimized platform-independent intermediate representation associated with it. A just-in-time compiler converts the optimized intermediate representation associated with the method about to be called to platform-dependent machine code based on a determination that the method descriptor data structure has an optimized platform-independent intermediate representation associated with it.

Other methods and systems consistent with the principles of the invention also enable platform-independent selective ahead-of-time compilation. A virtual machine on a device receives at least one method, wherein the method is from a subset of methods selected for ahead-of-time compilation, and wherein bytecodes corresponding to each selected method are converted to a platform-independent intermediate representation, the platform-independent intermediate representation of each selected method is optimized, and each optimized platform-independent intermediate representation is stored with a corresponding selected method. An interpreter accesses a method descriptor data structure of a method about to be called, and determines whether the method descriptor data structure has an optimized platform-independent intermediate representation associated with it. A just-in-time compiler converts the optimized intermediate representation associated with the method about to be called to platform-dependent machine code based on a determination that the method descriptor data structure has an optimized platform-independent intermediate representation associated with it.

BRIEF DESCRIPTION OF THE DRAWINGS

The accompanying drawings are incorporated in and constitute a part of this specification and, together with the description, explain the features and principles of the invention. In the drawings.

DETAILED DESCRIPTION

The following detailed description of the invention refers to the accompanying drawings. While the description includes exemplary implementations, other implementations are possible, and changes may be made to the implementations described without departing from the spirit and scope of the invention. The following detailed description does not limit the invention. Instead, the scope of the invention is defined by the appended claims and their equivalents.

Overview

Methods and systems consistent with the principles of the invention enable platform-independent selective ahead-of-time compilation. A method selector comprising a profiling tool and heuristic select a subset of methods for ahead-of-time compilation. The profiling tool ranks a set of methods according to predetermined criteria, and the heuristic identifies the subset of methods from the set of methods. An ahead-of-time compiler comprises a first unit and a second unit. The first unit converts, for each selected method, bytecodes corresponding to the selected method to a platform-independent intermediate representation. The second unit optimizes the platform-independent intermediate representation of each selected method, wherein each optimized intermediate representation is stored with a corresponding selected method. A class preloader is operable to load, prior to runtime, at least one of the selected methods onto a device for execution. Furthermore, a dynamic class loader is operable to load, during runtime, at least one of the selected methods onto the device for execution.

A virtual machine located on a device is operable to receive at least one method from one of the class preloader and dynamic class loader. An interpreter in the virtual machine may access a method descriptor data structure of a method about to be called, and determine whether the method descriptor data structure has an optimized platform-independent intermediate representation associated with it. A just-in-time compiler in the virtual machine may convert the optimized intermediate representation associated with the method about to be called to platform-dependent machine code based on a determination that the method descriptor data structure has an optimized platform-independent intermediate representation associated with it.

Network Environment

Figure 1:
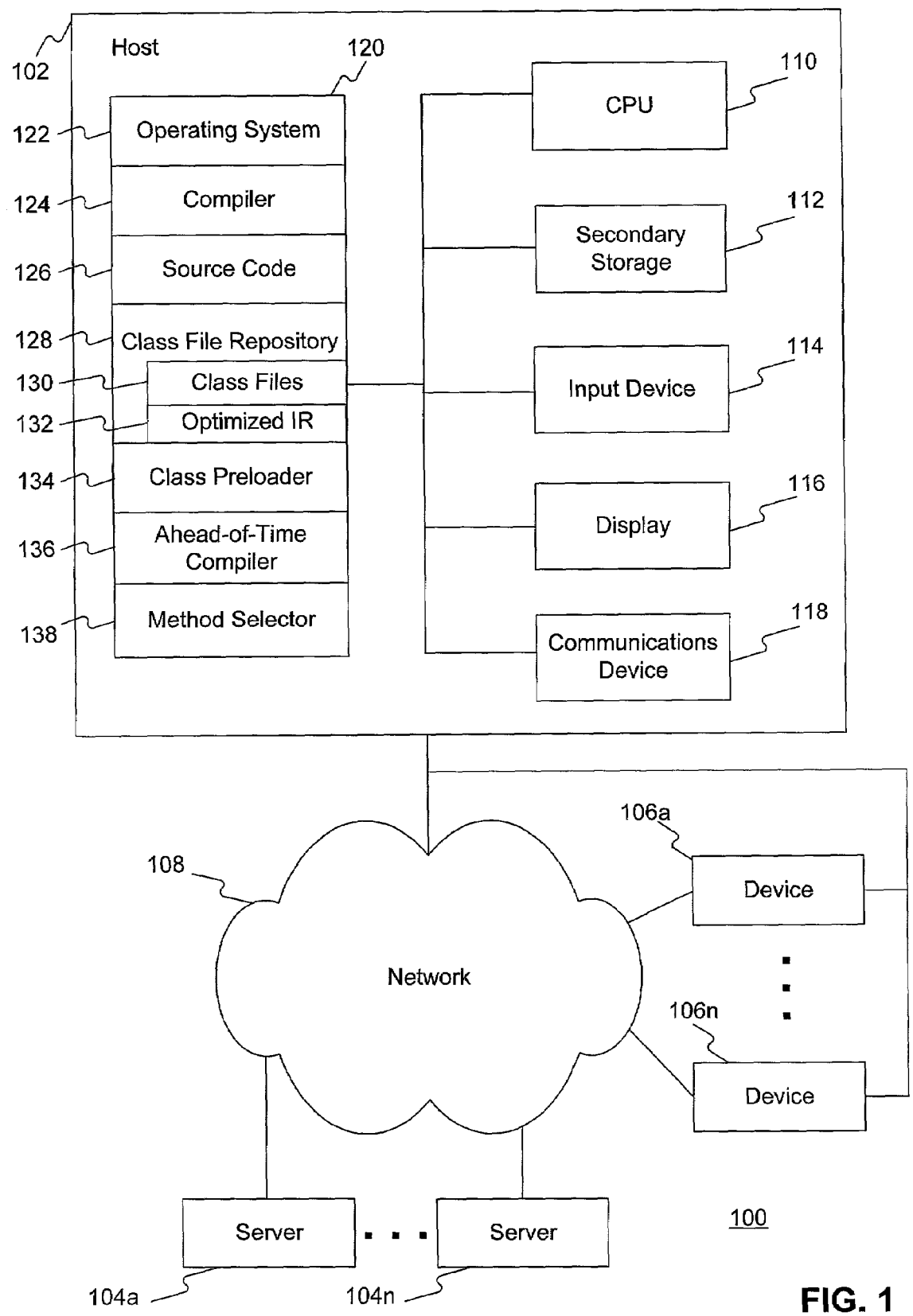
FIG. 1 is a diagram of an exemplary network environment in which features and aspects consistent with the present invention may be implemented.

FIG. 1 is a diagram of an exemplary network environment in which features and aspects consistent with the present invention may be implemented. Network environment 100 may include host 102, servers 104a–104n, devices 106a–106n, and network 108. The components of FIG. 1 may be implemented through hardware, software, and/or firmware. The number of components in network environment 100 is not limited to what is shown.

Host 102 and servers 104a–104n may supply devices 106a–106n with programs written in a platform-independent language, such as Java. For example, a software developer may create one or more Java programs and compile them into class files that contain bytecodes executable by a virtual machine, such as a Java virtual machine. When a device, such as device 106a, wishes to execute a Java program, it may issue a request to a server, such as server 104a, that contains the program. In response, server 104a transmits the corresponding class files to device 106a via an appropriate communication channel, such as network 108 (which may comprise a wired or wireless communication network, including the Internet). Device 106a may load the class files into a virtual machine located in device 106a and proceed to execute the Java program. Alternatively, a device may receive a program, such as a Java program, from host 102 via a direct connection, or from another device.

Host 102 may include CPU 110, secondary storage 112, input device 114, display 116, communications device 118, and memory 120. Memory 120 may include operating system 122, compiler 124, source code 126, class file repository 128, which includes class files 130 and optimized intermediate representations (IR) 132, class preloader 134, ahead-of-time compiler 136, and method selector 138. An IR may be platform independent, system architecture neutral data which is processed from source code to a format that can be quickly processed into efficient, optimized machine dependent code at some future time.

Compiler 124 translates source code into class files that contain bytecodes executable by a virtual machine. Source code 126 may be files containing code written in the Java programming language. Class file repository 128 includes class files 130 and optimized IR 132. Class files 130 are bytecodes executable by a virtual machine and contain data representing a particular class, including data structures, method implementations, and references to other classes. Optimized IR 132 are platform-independent intermediate representations that have been optimized using common compiler techniques and associated with particular methods subjected to ahead-of-time compilation. Class files and optimized IR stored in class file repository 128 may be stored either temporarily or on a more permanent basis.

Class preloader 134 is used to preload, onto a device with a virtual machine, certain classes prior to runtime. Any Java application, or any other set of methods that are normally loaded at runtime could be preloaded using class preloader 134. The operation of a class preloader is more particularly described in U.S. Pat. No. 5,966,542 to Tock, which has already been incorporated by reference.

Ahead-of-time compiler 136 handles the platform-independent parts of method compilation, leaving the final, platform-dependent part of method compilation to a JIT compiler running on a virtual machine. For example, ahead-of-time compiler 136 may utilize a profiling tool to identify methods that should be compiled prior to runtime. Thereafter, ahead-of-time compiler 136 performs bytecode to IR transformation and IR optimization on the identified methods. The resulting optimized IR from the compilation of each method is stored alongside the method.

Method selector 138 determines which methods should be compiled prior to runtime using ahead-of-time compiler 136. Method selector 138 may run a profiling tool on class files to create an ordered list of methods based on predetermined criteria. This ordered list is used with a heuristic to determine which methods should be compiled prior to runtime.

Figure 2A:
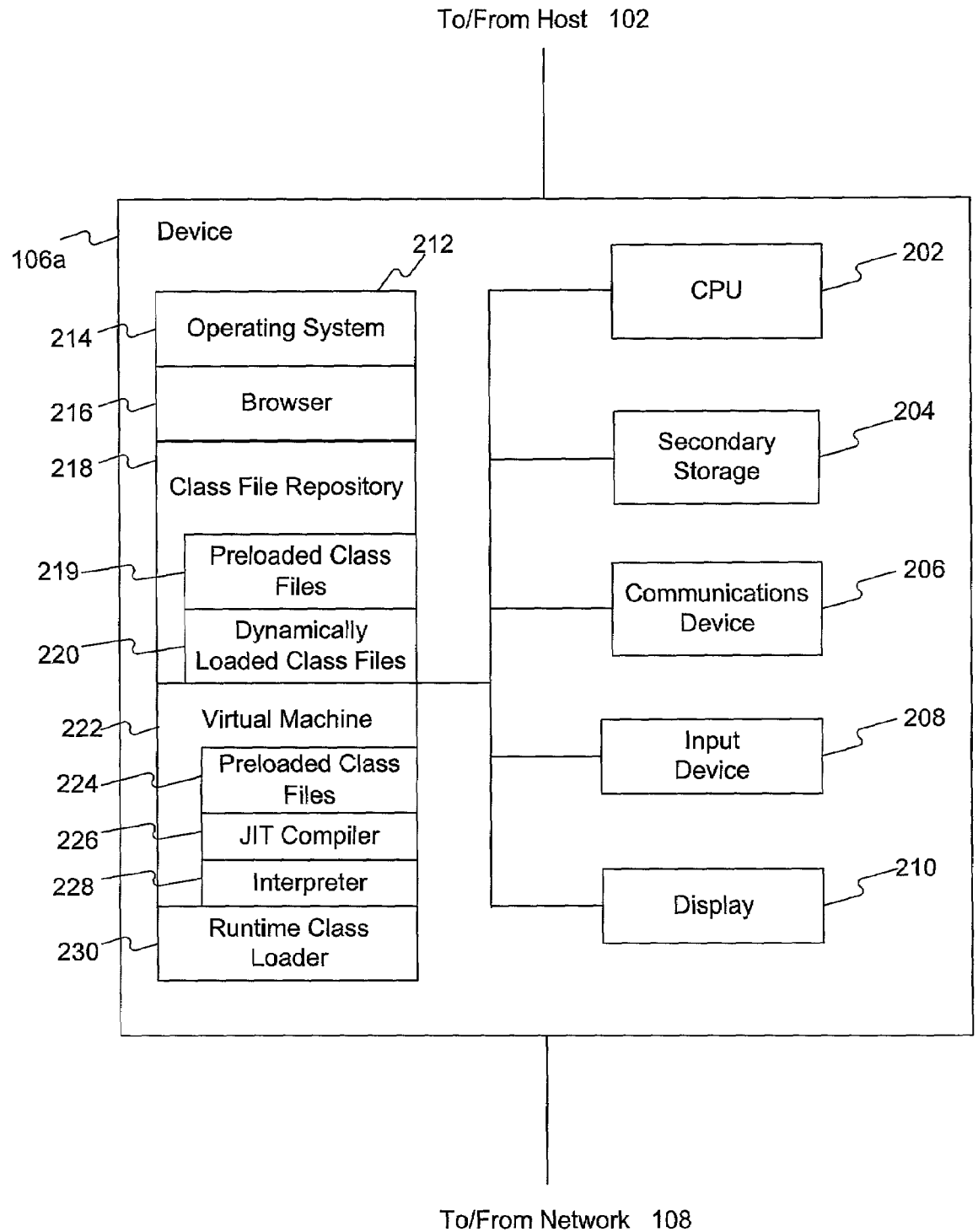
FIG. 2A is a diagram of a device consistent with the present invention.

FIG. 2A is a diagram of device 106a in greater detail, although the other devices 106b–106n may contain similar components. Device 106a may include CPU 202, secondary storage 204, communications device 206, input device 208, display 210, and memory 212. Memory 212 may include operating system 214, browser 216, class file repository 218, virtual machine 222, and runtime class loader 230.

When a user of device 106a wishes to execute a program stored on a server, such as server 104a, the user may use browser 216 to issue a request to server 104a. In response, server 104a transmits the corresponding class files to device 106a via network 108. For example, class files from server 104a may be stored either temporarily or on a more permanent basis in class file repository 218. Device 106a may load the class files into a virtual machine, such as virtual machine 222, located in device 106a and proceed to execute the program. Alternatively, device 106a may load class files from class file repository 218 that were not received from a server. For example, class file repository 218 may receive class files from host 102 for later loading into the virtual machine.

Class file repository 218 may include preloaded class files 219 and dynamically loaded class files 220. Preloaded class files 219 are those class files that are loaded onto device 106a prior to runtime using, for example, class preloader 134 on host 102. Dynamically loaded class files 220 are those class files that are dynamically loaded at runtime using, for example, runtime class loader 230. Preloaded class files 219 and dynamically loaded class files 220 may include optimized IR associated with particular methods that were subjected to ahead-of-time compilation.

Virtual machine 222 may include preloaded class files 224, JIT compiler 226 and interpreter 228 and is operable to execute class files. In one implementation, virtual machine 222 is a Java virtual machine. One of ordinary skill in the art will recognize that other types of virtual machines may be used instead. Preloaded class files 224 are those class files that are loaded onto device 106a prior to runtime using, for example, class preloader 134 on host 102, and may include optimized IR associated with particular methods that were subjected to ahead-of-time compilation. Virtual machine 222 may utilize both JIT compiler 226 and interpreter 228 to help execute class files.

JIT compiler 226 performs either fast compilation or JIT compilation of methods. Fast compilation may occur when JIT compiler 226 processes a method that is associated with a pre-computed optimized IR. For example, when JIT compiler 226 receives a method with an optimized IR, it converts the IR to platform-dependent machine code, which may then be executed by virtual machine 222. JIT compilation may occur when JIT compiler 226 processes a method that is not associated with a pre-computed optimized IR. For example, when JIT compiler 226 receives a method without an optimized IR, the method may be processed during runtime using traditional JIT compilation (e.g., bytecode to IR transformation, IR optimization, and code generation).

Interpreter 228 interprets Java class files without compilation to platform-dependent code. Interpreter 228 examines methods being executed by virtual machine 224 to determine whether an optimized IR is associated with specific methods. If a method does have an optimized IR, then interpreter 228 causes JIT compiler 226 to perform a fast compilation on the method. Otherwise, interpreter 228 may perform further tests on a method to decide whether the method should be interpreted or compiled by JIT compiler 226 using JIT compilation.

Runtime class loader 230 dynamically loads classes into a user's address space at runtime. For example, runtime class loader 230 may pull class files (which may include optimized IR) during runtime from a local class file repository, such as class file repository 218, or from a remote class file repository on a server or another device. These class files may then be appropriately processed for execution.

Figure 2B:
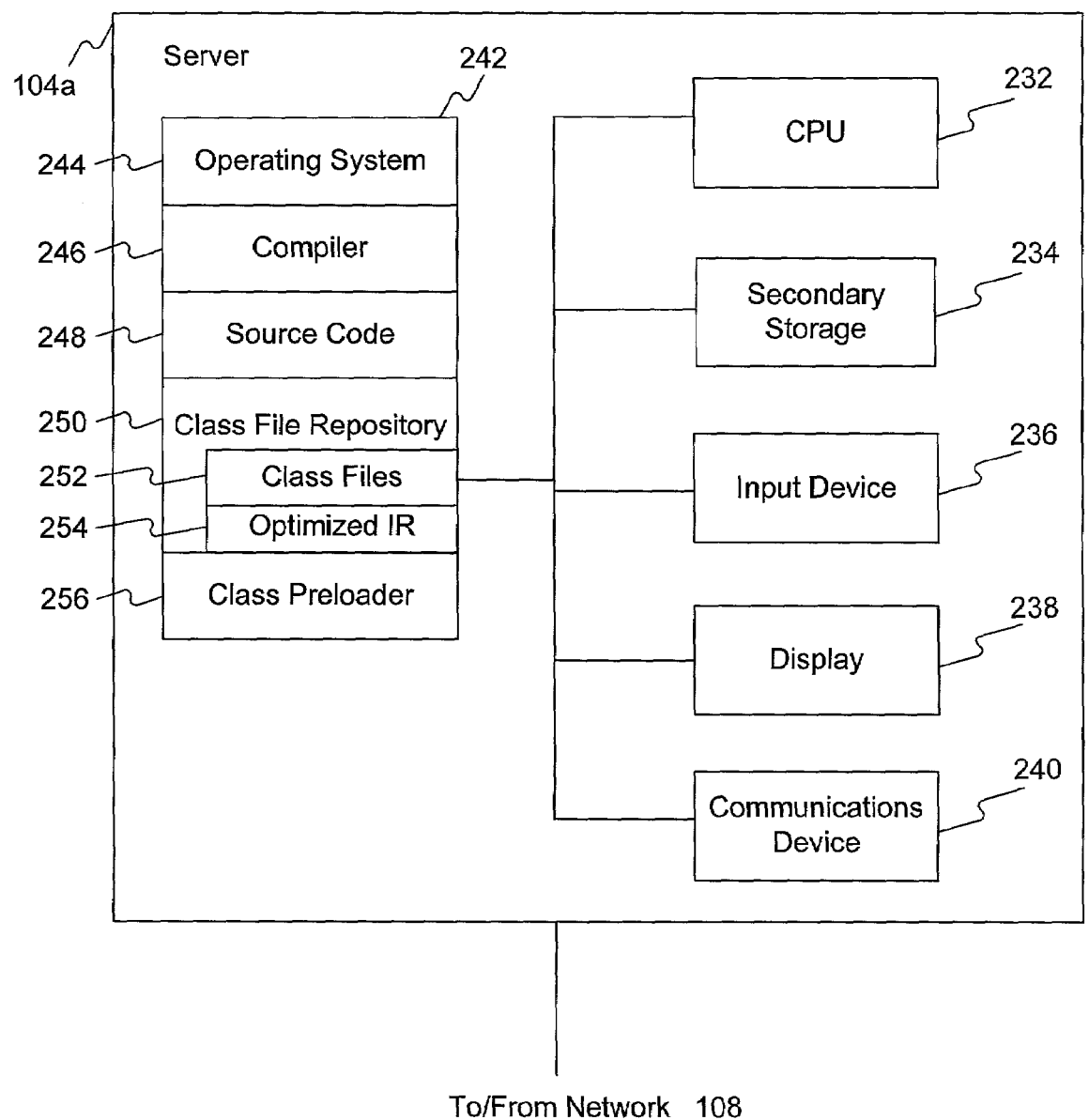
FIG. 2B is a diagram of a server consistent with the present invention.

FIG. 2B is a diagram of server 104a in greater detail, although the other devices 106b–106n may contain similar components. Server 104a may include CPU 232, secondary storage 234, input device 236, display 238, communications device 240, and memory 242. Memory 242 may include operating system 244, compiler 246, source code 248, class file repository 250, which includes class files 252 and optimized intermediate representations (IR) 254, and class preloader 256. The various units of server 104a function in a manner similar to the similarly named units of host 102.

Server 104a may receive class files 252 and optimized IR 254 from host 102, which may perform ahead-of-time compilation. Server 104a may then distribute class files 252 and optimized IR 254 to a device, such as device 106a, as needed. For example, server 104a may utilize class preloader 256 to load the appropriate data onto device 106a prior to runtime. Alternatively, a runtime class loader on device 106a may pull data from class file repository 250 during runtime.

Figure 3:
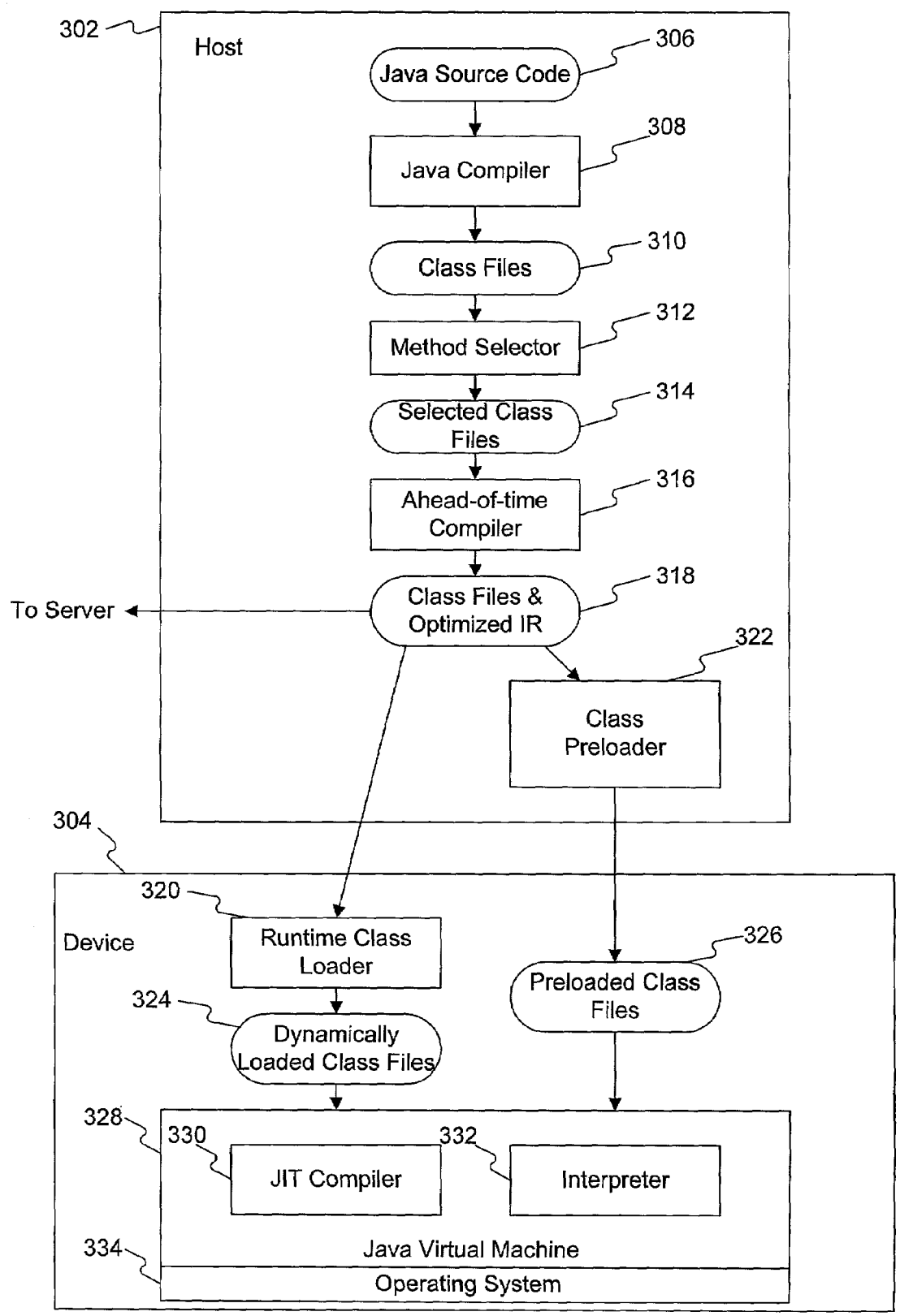
FIG. 3 is a diagram showing the dataflow involved in platform-independent selective ahead-of-time compilation consistent with the present invention.

FIG. 3 is a diagram showing the dataflow involved in platform-independent selective ahead-of-time compilation consistent with the present invention. In the diagram depicted in FIG. 3, device 304 executes a Java program that was initially located on host 302. Java source code 306 is provided to Java compiler 308, which translates Java source code into class files 310 that contain bytecodes executable by a virtual machine. Class files 310 may be provided to method selector 312. Method selector 312 may select various methods to be compiled prior to runtime and pass the selected class files 314 associated with the methods to ahead-of-time compiler 316, which may perform an ahead-of-time compilation on some of the selected class files 314.

Ahead-of-time compiler 316 performs ahead-of-time compilation (e.g., prior to runtime) on identified methods. For example, ahead-of-time compiler 316 first converts bytecodes to an IR. Next, ahead-of-time compiler 316 optimizes the IR using common compiler techniques. Ahead-of-time compiler 316 also causes the optimized IR to be stored alongside the respective relevant methods. As a result, ahead-of-time compiler 316 may output various class files, along with associated optimized IR (class files & optimized IR 318), if any. In one implementation, ahead-of-time compiler 316 may also output some class files that do not have any optimized IR associated with them, such that some class files from ahead-of-time compiler 316 have optimized IR and some do not. Greater detail on the operation of an ahead-of-time compiler is provided below with reference to FIGS. 4–5.

Class files & optimized IR 318 may be provided to either class preloader 322 or to storage local to device 304, such as a class file repository (where runtime class loader 320 may then access the data), without preloading. Alternatively, class files & optimized IR 318 may be provided to a server for later distribution to a device.

Runtime class loader 320 may receive class files at the same time that it receives related optimized IR. For example, runtime class loader 320 may receive class files and optimized IR where the optimized IR are stored as new attributes in method descriptors. Class preloader 322, however, may receive class files at a different time than it receives related optimized IR. In this manner, class preloader 322 operates like an assembly line, storing optimized IR as a field of method descriptors as it receives them. Alternatively, ahead-of-time compiler 316 or a separate not shown) may store optimized IR as a field of method descriptors in a class file before being forwarded to class preloader 322. Although runtime class loader 320 is depicted in FIG. 3 as being external to Java virtual machine 328, some or all of runtime class loader 320 may alternatively be internal to Java virtual machine 328.

Runtime class loader 320 and class preloader 322 load class files onto device 304 dynamically or prior to runtime, respectively. Both preloaded class files 326 and dynamically loaded class files 324 may include optimized IR stored as a field of method descriptors corresponding to methods compiled prior to runtime. Preloaded class files 326 are stored on device 304 prior to runtime. Accordingly, if a method has an optimized IR associated with it, the optimized IR needs to be stored as a field in the method descriptor either by class preloader 322 or a unit exterior to class preloader 322 before runtime commences. Although preloaded class files 326 are depicted in FIG. 3 as initially being external to Java virtual machine 328, some or all of the preloaded class files 326 may alternatively reside in Java virtual machine 328. Runtime class loader 320 receives class files & optimized IR during runtime from a server, another device, or local storage, and then produces dynamically loaded class files 324. Accordingly, a method with an optimized IR associated with it may have the optimized IR stored in its method descriptor either at runtime or prior to runtime. Greater detail on storing optimized IR with a method is provided below with reference to FIGS. 4–7.

Dynamically loaded class files 324 and/or preloaded class files 326 are provided to Java virtual machine 328, where JIT compiler 330, interpreter 332, services from the underlying operating system 334, and the computer hardware (not shown) aid in the execution of the class files. Interpreter 332 recognizes whether a particular method has an optimized IR associated with it and may cause JIT compiler 330 to compile the method using fast compilation (e.g., skip bytecode to IR transformation and IR optimization), if there is such an optimized IR. Greater detail on the operation of a JIT compiler and interpreter consistent with the present invention is provided below with reference to FIG. 8.

Figure 4A:
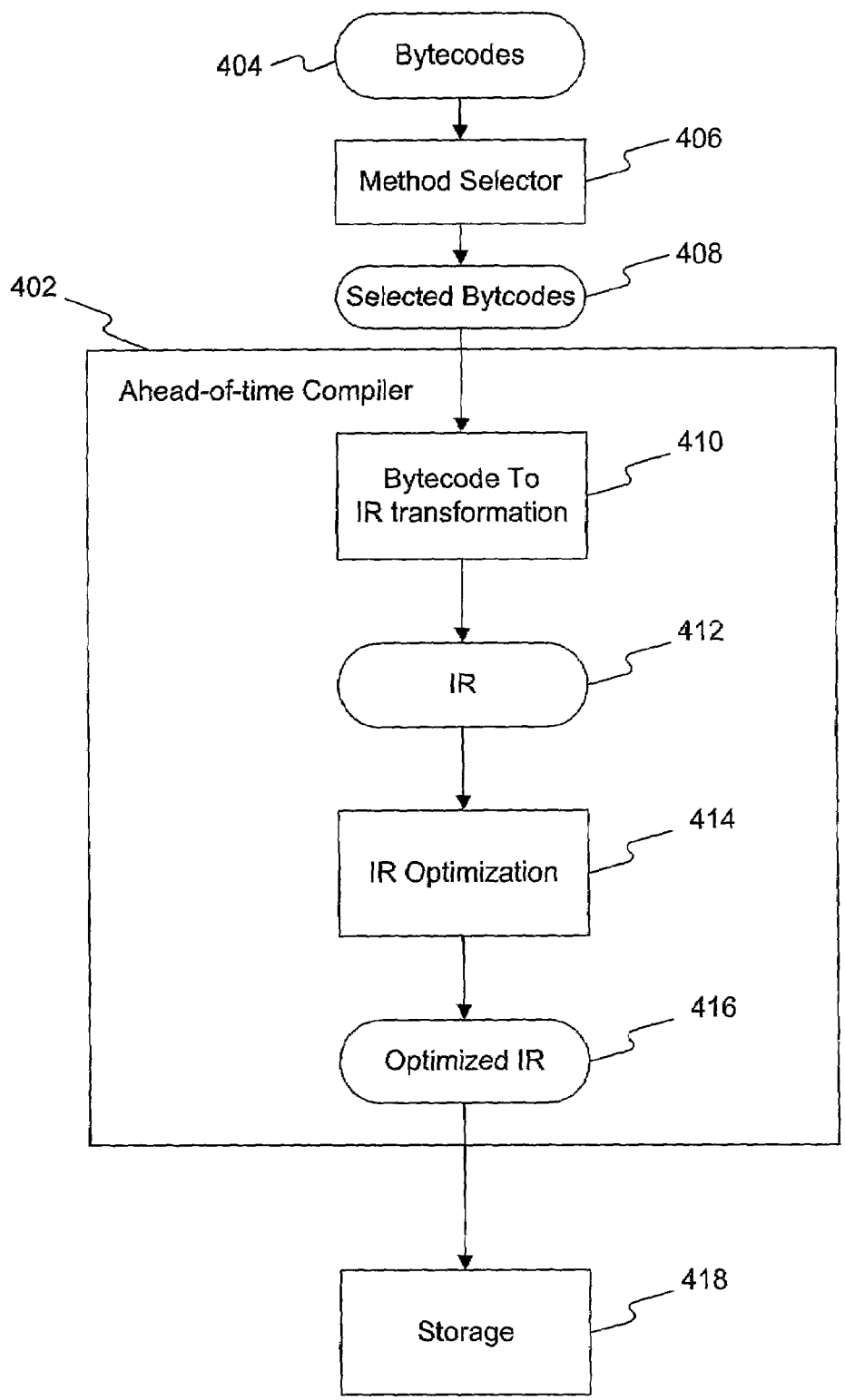
FIG. 4A is a diagram showing the dataflow involved in the operation of an ahead-of-time compiler consistent with the present invention.

FIG. 4A is a diagram showing the dataflow involved in the operation of an ahead-of-time compiler consistent with the present invention. Bytecodes 404 from a class file are provided to method selector 406, which may be outside ahead-of-time compiler 402, where methods that are to be compiled prior to runtime are selected. Alternatively, method selector 406 may be internal to ahead-of-time compiler 402. Method selector 406 may subsequently send selected bytecodes 408 associated with the selected methods to ahead-of-time compiler 402. Specifically, selected bytecodes 408 are sent to bytecode to IR transformation unit 408. The selected bytecodes 408 are provided to bytecode to IR transformation unit 410 for conversion to platform-independent intermediate representations (IR). The IR 412 are provided to IR optimization unit 414, where they are changed into optimized IR 416 using common compiler techniques. Subsequently, optimized IR 416 are stored alongside the relevant methods (storage 418). The optimized IR and corresponding methods are made available for use by a class preloader or runtime class loader.

Figure 4B:
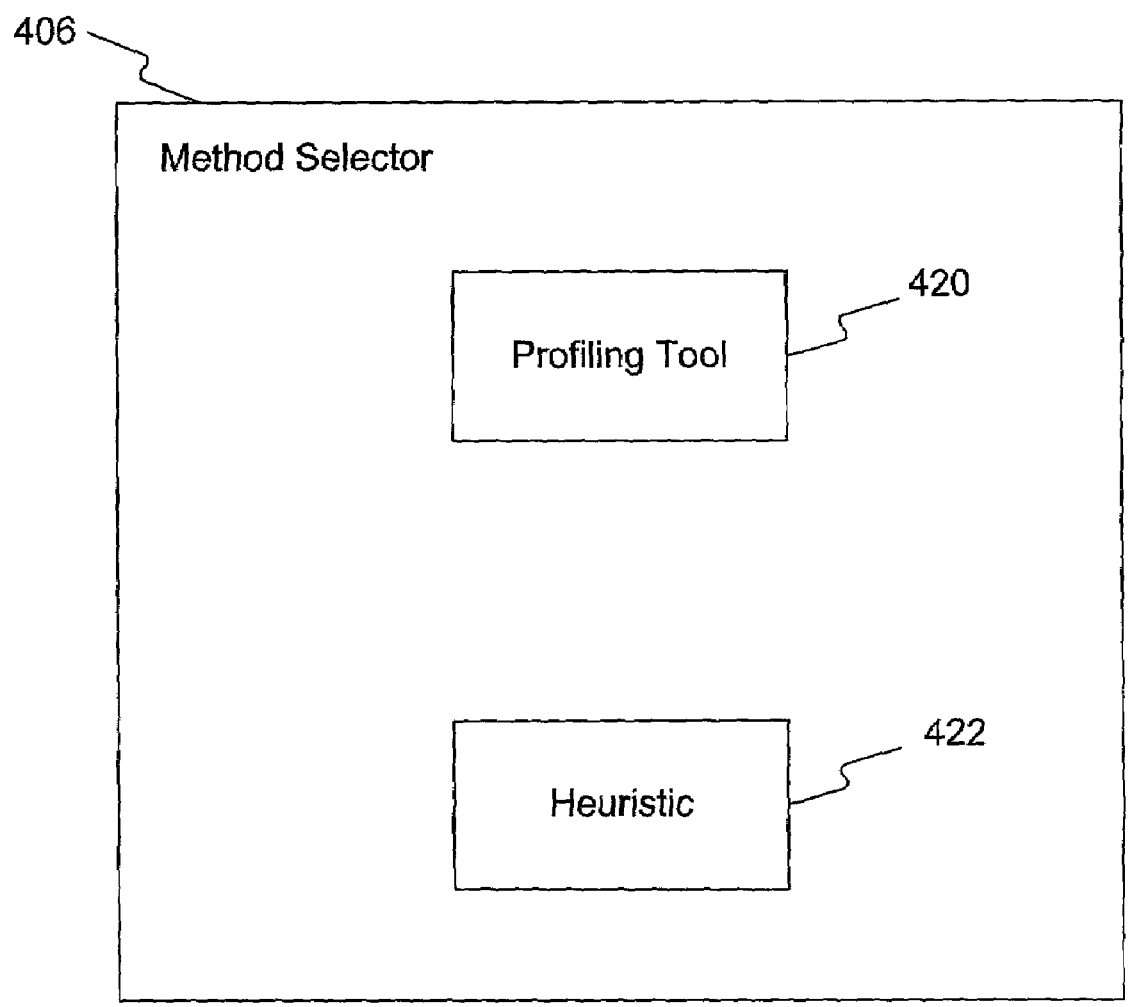
FIG. 4B is a diagram of a method selector consistent with the present invention.

FIG. 4B is a diagram of a method selector 406 in greater detail. Profiling tool 420 runs on class files or Java source code to create an ordered list of methods based on predetermined criteria. For example, profiling tool 420 may rank methods according to number of times called, execution time, memory size, predetermined list, randomly, and various other factors. Heuristic 422 may examine the list created by profiling tool 420 and, using developer-chosen criteria, determine which specific methods from the list should be compiled prior to runtime. Profiling tool 420 and heuristic 422 need not be part of the same unit (e.g., method selector 406). Additionally, profiling tool 420 may be located on a device with a virtual machine. In such a configuration, profiling tool 420 may collect statistics on programs as they are running on the virtual machine, and subsequently send the heuristic (which may be on a host, server, another device, or the same device as the profiling tool) an ordered list of methods for further processing.

Figure 5:
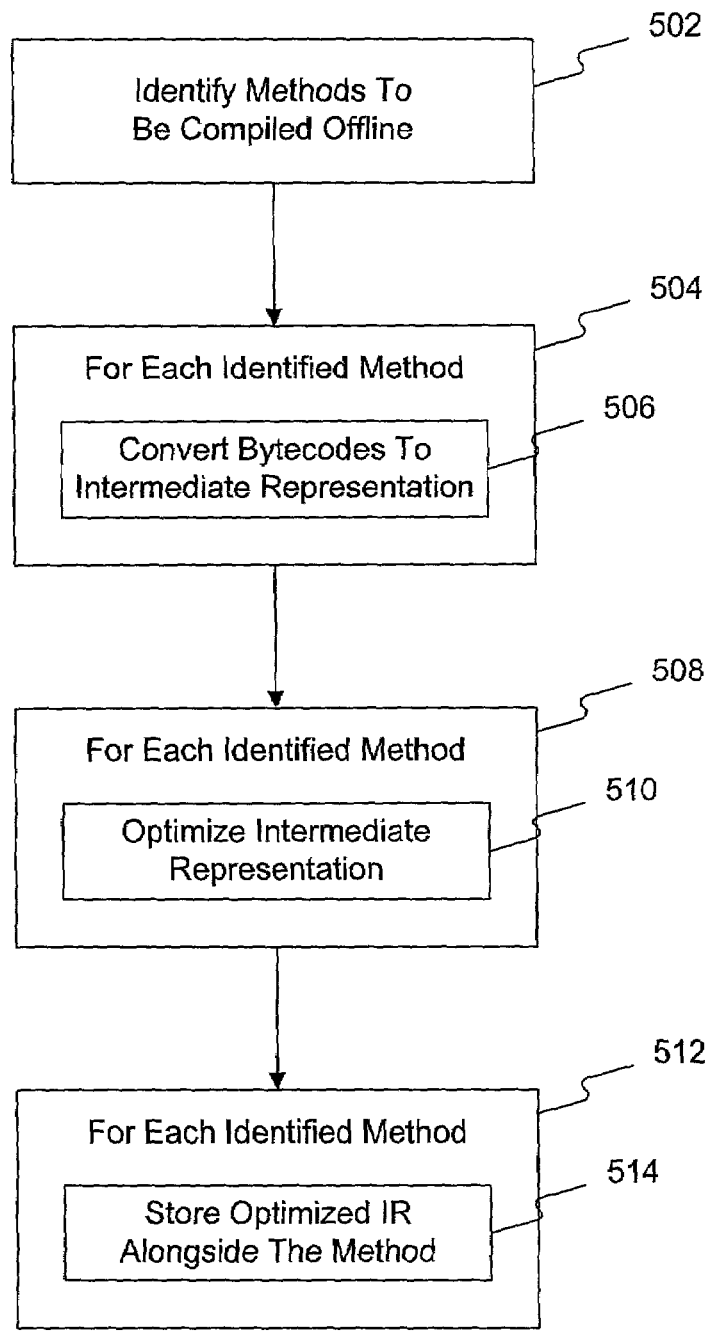
FIG. 5 is an exemplary flowchart of a method for compiling methods ahead-of-time consistent with the present invention.

FIG. 5 is an exemplary flowchart of a method for compiling methods ahead-of-time consistent with the present invention. The flowchart of FIG. 5 corresponds to the dataflow of FIG. 4. Although the steps of the flow chart are described in a particular order, one skilled in the art will appreciate that these steps may be performed in a different order, or that some of these steps may be concurrent.

First, a method selector identifies the methods that should be compiled prior to runtime (step 502). For example, a profiling tool of the method selector may run an application or a set of applications (e.g., Java source code or bytecodes). As the profiling tool runs the applications, it may collect statistics on the various methods in the applications. The profiling tool may then create an ordered list of methods, ranked according to predetermined criteria. For example, the profiling tool may determine which methods are called the most often and rank the methods accordingly, with the most-called method ranked first. Another factor which the profiling tool may use is memory size. For example, the profiling tool may rank methods according to memory size, because space available for storing an IR may be limited. Other factors that may be used to help determine how methods are initially ranked include execution time, a list predetermined by a developer, or random ranking. One skilled in the art will recognize that the aforementioned factors may each be used as a sole basis for ranking or in some combination with each other, and that additional factors not specifically listed here may be used.

Once the profiling tool creates an ordered list of methods, it uses the ordered list with a heuristic to determine which of the most used methods should be compiled prior to runtime. The heuristic essentially shortens the ordered list created by the profiling tool. The shortened list comprises the methods that should be compiled prior to runtime. A developer may choose the criteria that the heuristic uses to determine exactly which methods should selected. For example, a developer may decide that only the first ten methods on the ordered list should be compiled prior to runtime, or that only methods that were called more than a certain number of times should be selected. Alternatively, the developer may specify that a certain number of random methods from the ordered list should be selected, or that only those methods from a predetermined list that are in the top 40 methods of the ordered list should be selected. One skilled in the art will recognize that the developer may choose criteria not specifically mentioned here to determine which methods from an ordered list should be compiled prior to runtime. The method selector (e.g., profiling tool and heuristic) described above may be part of an ahead-of-time compiler, or it may be a separate unit.

For each method identified as a method that should be compiled prior to runtime (step 504), the ahead-of-time compiler converts the bytecodes of the method to an intermediate representation (IR) (step 506). The ahead-of-time compiler also optimizes the IR of each identified method (steps 508, 510). An IR may be optimized using common compiler techniques. Because the techniques are utilized prior to runtime, compiler techniques that may be too expensive for runtime computation may be utilized. Examples of such techniques include global common sub-expression, loop invariant hoisting, common sub-expression elimination, and liveness analysis. One skilled in the art will recognize that other compiler techniques may be used.

After the intermediate representations (IR) have been optimized, the ahead-of-time compiler may cause the optimized IR of each identified method to be stored alongside its corresponding method (steps 512, 514). Optimized IR may be stored in two different ways. The type of storage is dependent on whether classes associated with the optimized IR are preloaded or dynamically loaded. When a class associated with an optimized IR is initially designated to be preloaded, the optimized IR is stored as a field of the method descriptor data structure of the method that was compiled to create the optimized IR. Alternatively, the method descriptor may contain a pointer to the optimized IR instead of containing the optimized IR itself. The method descriptor may also contain a flag indicating that the method has an optimized IR associated with it. Once the optimized IR has been stored with the method descriptor, the class preloader may proceed to preload the method descriptor or store the method descriptor for later dynamic loading by the runtime class loader.

Figure 6:
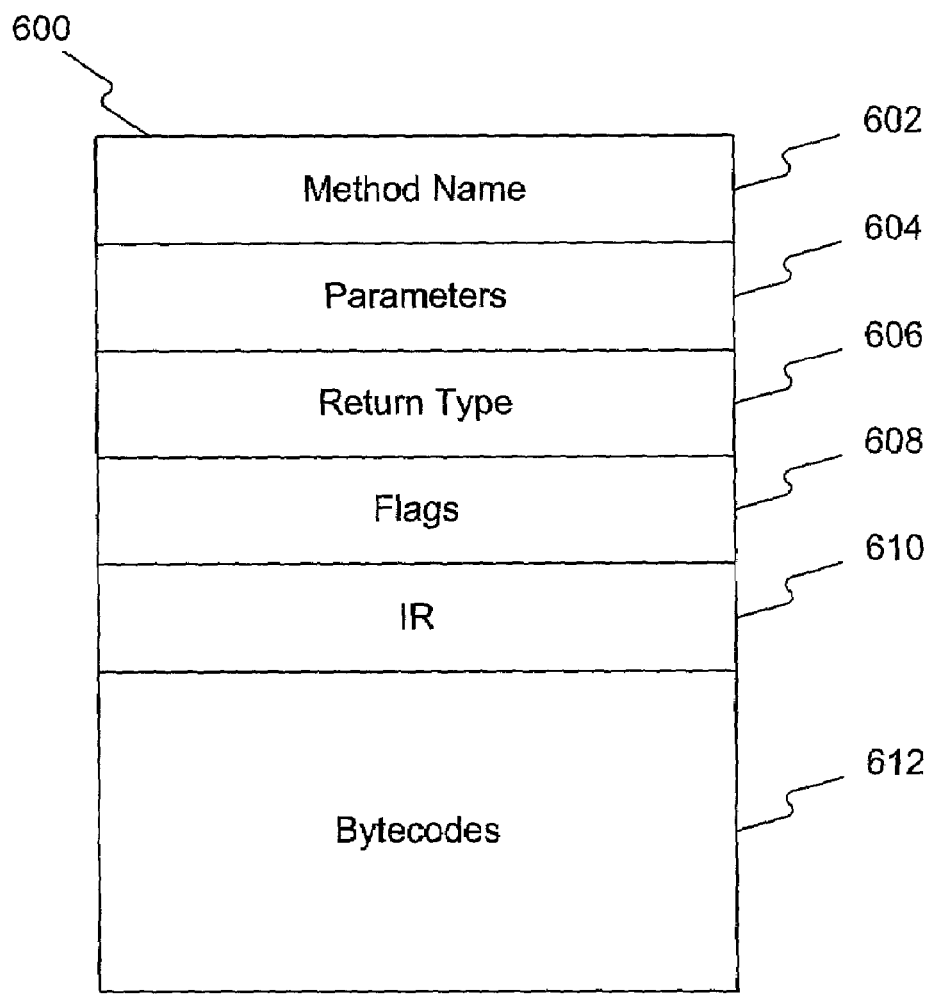
FIG. 6 is a diagram of a method descriptor with an optimized IR stored as a field consistent with the present invention.

FIG. 6 is an exemplary diagram of a method descriptor that has an optimized IR stored as a field. One skilled in the art will recognize that method descriptor 600 is not limited to the specific fields depicted in FIG. 6. Method descriptor 600 includes method name 602, parameters 604, return type 606, flags 608, IR 610, and bytecode 612. Method name 602 represents the name to be used when referencing the method. Parameters 604 is a list of arguments that the method uses. Each parameter is a Java class type. Return type 606 is a Java class type that is returned by the method upon execution. Flags 608 are a number of indicators used to denote various properties of the method. Flags 608 may include a flag indicating that there is an IR associated with the method. IR 610 is a platform-independent intermediate representation (IR) resulting from the ahead-of-time compilation of the method. IR 610 may be the IR itself or a pointer to the IR. Bytecodes 612 are the bytecodes and auxiliary information needed to implement the method in cases where the IR does not end up being compiled.

When a class associated with an optimized IR is initially designated to be dynamically loaded, the IR is stored as a new attribute of the method descriptor for the method. Accordingly, when a program being executed by a virtual machine on a device needs a method with an optimized IR from a server (or from another device or local storage area on the same device), a runtime class loader may load the appropriate class file onto the device. Prior to loading, if the runtime class loader is programmed to recognize the new attribute that corresponds to the IR, then it accesses the IR attribute and stores the IR as a field in the method descriptor (the IR itself or a pointer to the IR may be stored as a field). Also, the method descriptor is flagged as containing an IR. In this manner, the runtime class loader may transform the method descriptor into a method descriptor that is similar to that normally used for preloading. Alternatively, an ahead-of-time compiler may recognize the IR attribute, store the IR as a field in the method descriptor, and flag the method descriptor as containing an IR. Moreover, a development tool may perform these steps during development time (e.g., outside of runtime).

Figure 7:
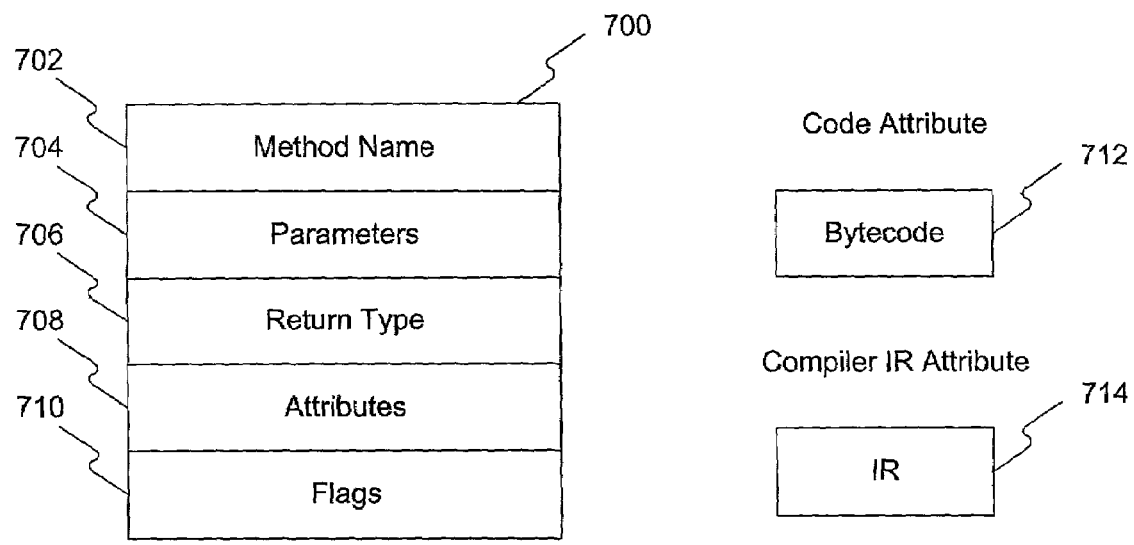
FIG. 7 is a diagram of a method descriptor and related attributes for use in dynamic class loading consistent with the present invention.

FIG. 7 is an exemplary diagram of a method descriptor and related attributes for use in dynamic class loading. One skilled in the art will recognize that method descriptor 700 is not limited to the specific fields depicted in FIG. 7, and that additional attributes may be associated with the descriptor. Method descriptor 700 includes method name 702, parameters 704, return type 706, attributes 708, and flags 710. Attributes 708 includes a list of attribute structures for use in conjunction with the method. In order to properly process attributes, a virtual machine, runtime class loader, or ahead-of-time compiler must be able to recognize and correctly read the attribute structures. Code attribute 712 includes the bytecodes and auxiliary information needed to implement the method. Compiler IR attribute 714 includes a platform-independent intermediate representation resulting from the ahead-of-time compilation of the method. If the runtime class loader or ahead-of-time compiler recognizes Compiler IR attribute 714 and Code attribute 712, it includes the bytecode and IR of these attributes as fields of method descriptor 700 (e.g., it stores the bytecode and IR in the method descriptor).

Figure 8:
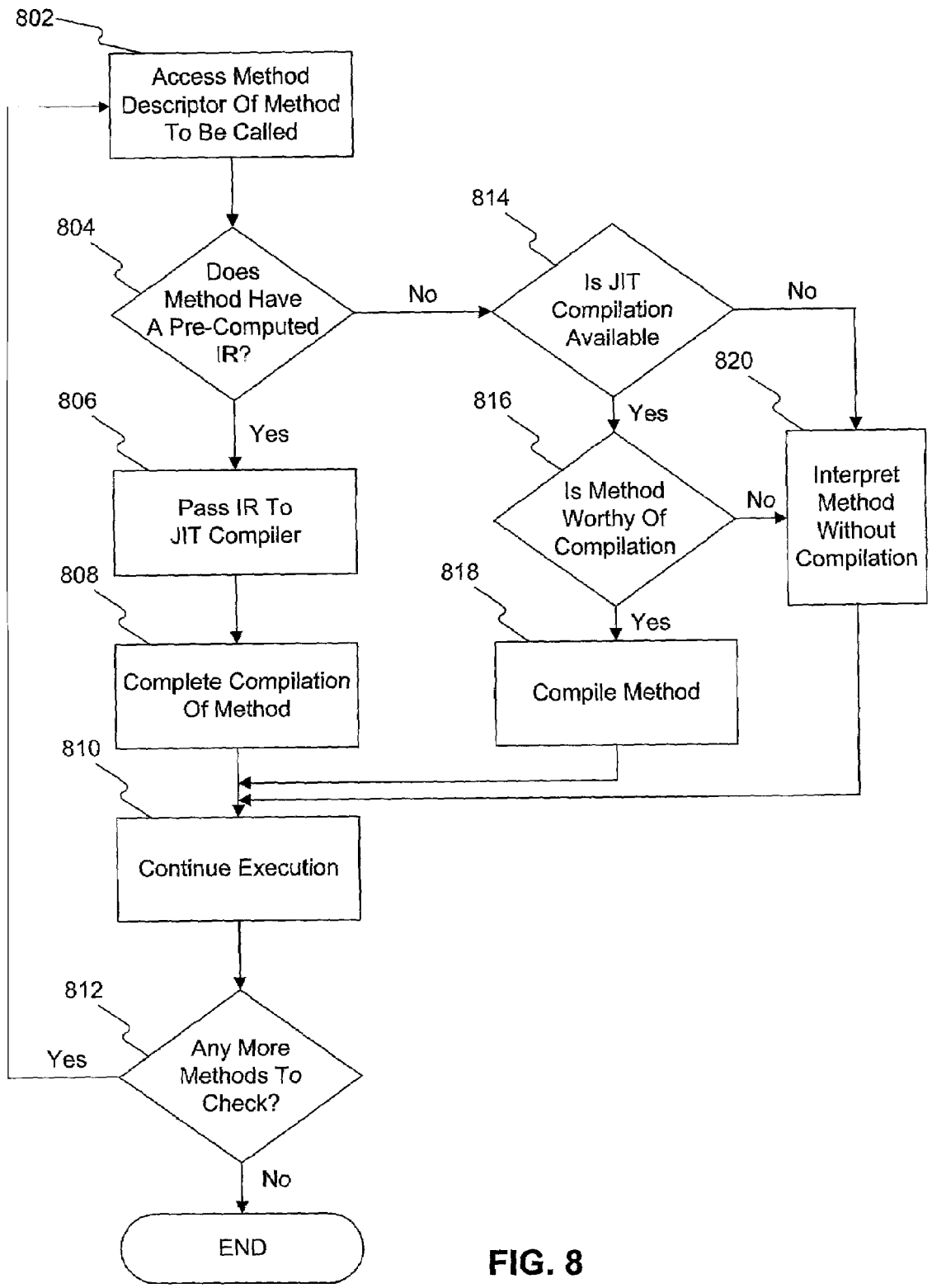
FIG. 8 is an exemplary flowchart for executing processes consistent with the present invention.

FIG. 8 is an exemplary flowchart for executing methods consistent with the present invention. Although the steps of the flow chart are described in a particular order, one skilled in the art will appreciate that these steps may be performed in a different order, or that some of these steps may be concurrent.

When a virtual machine, such as virtual machine 222, runs a program, various methods are loaded into the virtual machine either as part of preloading or dynamic class loading. If the runtime class loader recognizes that methods containing the Compiler IR attribute are loaded as part of dynamic class loading, the IR becomes a field of the method descriptor data structure prior to being loaded into the virtual machine. Also, the method descriptor is flagged as containing an IR. Alternatively, the IR of the Compiler IR attribute may be stored in the method descriptor data structure prior to runtime. Pre-loaded methods with an IR are already flagged and, have the IR as a field. As the virtual machine proceeds with executing a program, each time a method is about to be called, the interpreter of the virtual machine accesses the method descriptor of the method to be called (step 802).

Next, the interpreter makes a determination as to whether the method to be called has a pre-computed IR (step 804). Specifically, the interpreter checks the flags of the method descriptor to see if there is a flag indicating that there is an IR associated with the method. If there is an IR associated with the method, then the interpreter passes the IR to a JIT compiler (step 806). Alternatively, instead of automatically sending the IR to the JIT compiler, the virtual machine may subject the method to further tests to determine whether the IR should be compiled. For example, the virtual machine may use factors such as memory usage during runtime, processor usage, user decision (e.g., user decides that he does not want IR compiled), execution time, and/or fuzzy logic, to decide whether an IR should be compiled. If the virtual machine determines that the method should still be compiled, the interpreter may pass the IR to the JIT compiler. If the virtual machine decides that the IR should not be compiled, then the interpreter proceeds to interpret the method without compilation.

Upon receiving the IR, the JIT compiler completes the compilation of the method by performing a fast compilation on it (step 808). For example, the JIT compiler may translate the optimized IR to machine dependent code (e.g., code generation). The bytecode to IR transformation and IR optimization steps that are normally part of a JIT compilation are not performed. After fast compilation has been performed, the virtual machine continues execution (step 810). Specifically, the virtual machine jumps to the now compiled code of the method. After the virtual machine executes the method, execution of the rest of the Java program may continue. If execution does not lead to the calling of any more methods, then execution continues until it is complete (step 812—No). If the virtual machine determines that another method is about to be called, then the appropriate method descriptor may be accessed and processed as described above (step 812—Yes).

If the interpreter determines that a method to be called does not have a pre-computed IR (or if the interpreter is not programmed to recognize whether a method has a pre-computed IR), then the interpreter makes a determination as to whether JIT compilation is available (step 814). For example, the interpreter may check a flag or other indicator associated with the JIT compiler to determine whether the JIT compiler is configured to perform JIT compilation. JIT compilation refers to compilation that at least includes bytecode to IR transformation, IR optimization, and code generation. If the interpreter determines that JIT compilation is available, the JIT compiler makes a determination as to whether the method to be called is worthy of compilation (step 816). For example, a method may not be worthy of compilation if the bytecode is so short, that it is not worth the time it would take to compile the bytecode. If the JIT compiler determines that the method is worthy of compilation, then it proceeds to compile the method using JIT compilation (step 818). Thereafter, the virtual machine continues execution with a jump to the now compiled code of the method.

If the interpreter determines that JIT compilation is not available, or if the JIT compiler determines that a method is not worthy of compilation, then the interpreter proceeds to interpret the method without compilation (step 820). The virtual machine may then continue execution of the rest of the Java program.

While the present invention has been described in connection with various embodiments, many modifications will be readily apparent to those skilled in the art. Although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave, optical signal or digital signal from a network, such as the Internet; or other forms of RAM or ROM either currently known or later developed. Additionally, although a number of the software components are described as being located on the same machine, one skilled in the art will appreciate that these components may be distributed over a number of machines. The invention, therefore, is not limited to the disclosure herein, but is intended to cover any adaptations or variations thereof.

What is claimed is:

1. A process for platform-independent selective ahead-of-time compilation in a system including a host and a device, comprising:

selecting, by the host, a subset of methods from bytecodes for ahead-of-time compilation, the selecting including ranking a set of methods according to predetermined criteria and identifying the subset of methods from the set of methods using a heuristic, wherein the bytecodes are compiled from source codes prior to the ahead-of-time compilation;

converting, by the host, for each selected method, the bytecodes corresponding to the selected method to a platform-independent intermediate representation;

storing each of the intermediate representations with a corresponding selected method; and loading at least one of the selected methods onto the device for execution by a virtual machine on the device, wherein the virtual machine accesses a method descriptor data structure associated with the at least one selected method, determines whether the at least one selected method has an intermediate representation associated with it, and, based on a determination that the at least one selected method is associated with an intermediate representation, converts the intermediate representation associated with the at least one selected method to platform-dependent machine code.

2. The process of claim 1, further comprising:
optimizing, by the host, the platform-independent intermediate representation of each selected method before the storing.

3. The process of claim 1, wherein the ranking includes creating an ordered list of methods in the set of methods.

4. The process of claim 1, wherein the predetermined criteria is number of times called.

5. The process of claim 1, wherein the predetermined criteria is memory size.

6. The process of claim 1, wherein the predetermined criteria is execution time.

7. The process of claim 1, wherein the predetermined criteria is a list determined by a developer.

8. The process of claim 1, wherein the heuristic is based on developer-chosen criteria.

9. The process of claim 2, said storing comprising storing each optimized intermediate representation as one of a field of a corresponding method descriptor data structure and an attribute of the corresponding method descriptor data structure.

10. The process of claim 9, wherein an optimized intermediate representation is stored as a field of a corresponding method descriptor data structure when the corresponding selected method is preloaded.

11. The process of claim 9, wherein an optimized intermediate representation is stored as an attribute of a corresponding method descriptor data structure when the corresponding selected method is dynamically loaded.

12. The process of claim 1, wherein the virtual machine determines whether the at least one selected method has a platform-independent intermediate representation associated with it by checking a flag in the associated method descriptor data structure.

13. The process of claim 1, wherein the virtual machine selectively converts the platform-independent intermediate representation associated with the at least one selected method to platform-dependent code.

14. The process of claim 13, wherein the selective conversion is based on at least one of memory usage during runtime, processor usage, user decision, or fuzzy logic.

15. The process of claim 2, wherein the optimizing is performed according to at least one of global common subexpression, loop invariant hoisting, common sub-expression elimination, and liveness analysis.

16. A process for platform-independent selective ahead-of-time compilation in a system including a host and a device, comprising:

selecting, by the host, a subset of methods from bytecodes for ahead-of-time compilation, wherein the bytecodes are compiled from source codes prior to the ahead-of-time compilation;

converting, by the host, for each selected method, the bytecodes corresponding to the selected method to a platform-independent intermediate representation;

optimizing, by the host, the platform-independent intermediate representation of each selected method; and storing each of the optimized intermediate representations as one of a field of a corresponding method descriptor data structure and an attribute of the corresponding method descriptor data structure;

loading at least one of the selected methods onto the device for execution by a virtual machine on the device, wherein the virtual machine accesses a method descriptor data structure associated with the at least one selected method, determines whether the at least one selected method has an optimized intermediate representation associated with it, and, based on a determination that the at least one selected method is associated with an optimized intermediate representation, converts the optimized intermediate representation associated with the at least one selected method to platform-dependent machine code.

17. The process of claim 16, said selecting comprising:
ranking a set of methods according to predetermined criteria; and
identifying the subset of methods from the set of methods using a heuristic.

18. The process of claim 17, wherein the ranking includes creating an ordered list of methods in the set of methods.

19. The process of claim 17, wherein the predetermined criteria is number of times called.

20. The process of claim 17, wherein the predetermined criteria is memory size.

21. The process of claim 17, wherein the predetermined criteria is execution time.

22. The process of claim 17, wherein the predetermined criteria is a list determined by a developer.

23. The process of claim 17, wherein the heuristic is based on developer-chosen criteria.

24. The process of claim 16, wherein an optimized intermediate representation is stored as a field of a corresponding method descriptor data structure when the corresponding selected method is preloaded.

25. The process of claim 16, wherein an optimized intermediate representation is stored as an attribute of a corresponding method descriptor data structure when the corresponding selected method is dynamically loaded.

26. The process of claim 16, wherein the virtual machine determines whether the at least one selected method has a platform-independent intermediate representation associated with it by checking a flag in the associated method descriptor data structure.

27. The process of claim 16, wherein the virtual machine selectively converts the platform-independent intermediate representation associated with the at least one selected method to platform-dependent code.

28. The process of claim 27, wherein the selective conversion is based on at least one of memory usage during runtime, processor usage, user decision, or fuzzy logic.

29. A process, performed by a device, for platform-independent selective ahead-of-time compilation in a system including a host and the device, comprising:
receiving at least one method from the host, wherein the method is from a subset of methods from bytecodes selected by the host for ahead-of-time compilation, wherein the bytecodes are compiled from source codes prior to the ahead-of-time compilation, and wherein the bytecodes corresponding to each selected method are converted by the host to a platform-independent intermediate representation, and each of the platform-independent intermediate representations is stored with a corresponding selected method;
accessing a method descriptor data structure of a method about to be called;
determining whether the method descriptor data structure has a platform-independent intermediate representation associated with it; and
converting the intermediate representation associated with the at least one selected method to platform-dependent machine code based on a determination that the method descriptor data structure has a platform-independent intermediate representation associated with it.

30. The process of claim 29, wherein the platform-independent intermediate representation of each selected method is optimized by the host before storing with a corresponding selected method.

31. An apparatus for platform-independent selective ahead-of-time compilation in a system including a host and a device, comprising:
a method selector on the host and operable to select a subset of methods from bytecodes for ahead-of-time compilation, the method selector including a profiling tool operable to rank a set of methods according to predetermined criteria and a heuristic operable to identify the subset of methods from the set of methods, wherein the bytecodes are compiled from source codes prior to the ahead-of-time compilation; and
an ahead-of-time compiler on the host, the ahead-of-time compiler including a first unit and a second unit, the first unit operable to convert, for each selected method, the bytecodes corresponding to the selected method to a platform-independent intermediate representation, and the second unit operable to optimize the platform-independent intermediate representation of each selected method, wherein each of the optimized intermediate representations is stored with a corresponding selected method;
a class preloader operable to load, prior to runtime, at least one of the selected methods onto the device for execution by a virtual machine, wherein
the virtual machine accesses a method descriptor data structure associated with the at least one selected method, determines whether the at least one selected method has an optimized intermediate representation associated with it, and, based on a determination that the at least one selected method is associated with an optimized intermediate representation, converts the optimized intermediate representation associated with the at least one selected method to platform-dependent machine code.

32. The apparatus of claim 31, wherein the profiling tool creates an ordered list of methods in the set of methods.

33. The apparatus of claim 31, wherein the predetermined criteria is number of times called.

34. The apparatus of claim 31, wherein the predetermined criteria is memory size.

35. The apparatus of claim 31, wherein the predetermined criteria is execution time.

36. The apparatus of claim 31, wherein the predetermined criteria is a list determined by a developer.

37. The apparatus of claim 31, wherein the heuristic identifies the subset of methods based on developer-chosen criteria.

38. The apparatus of claim 31, each optimized intermediate representation is stored as one of a field of a corresponding method descriptor data structure and an attribute of the corresponding method descriptor data structure.

39. The apparatus of claim 38, wherein an optimized intermediate representation is stored as a field of a corresponding method descriptor data structure when the corresponding selected method is loaded by the class preloader prior to runtime.

40. The apparatus of claim 38, wherein an optimized intermediate representation is stored as an attribute of a corresponding method descriptor data structure when the corresponding selected method is loaded by a dynamic class loader during runtime.

41. An apparatus for platform-independent selective ahead-of-time compilation in a system including a host, comprising:
- a virtual machine operable to receive at least one method from the host, wherein the method is from a subset of methods from bytecodes selected by the host for ahead-of-time compilation, wherein the bytecodes are compiled from source codes prior to the ahead-of-time compilation, and wherein the bytecodes corresponding to each selected method are converted by the host to a platform-independent intermediate representation, the platform-independent intermediate representation of each selected method is optimized by the host, and each of the optimized platform-independent intermediate representations is stored with a corresponding selected method;
- an interpreter operable to access a method descriptor data structure of a method about to be called, and determine whether the method descriptor data structure has an optimized platform-independent intermediate representation associated with it; and
- a just-in-time compiler operable to convert the optimized intermediate representation associated with the method about to be called to platform-dependent machine code based on a determination that the method descriptor data structure has an optimized platform-independent intermediate representation associated with it.

42. The apparatus of claim 41, wherein the interpreter determines whether the method descriptor data structure has an optimized platform-independent intermediate representation associated with it by checking a flag in the method descriptor data structure.

43. The apparatus of claim 41, wherein the just-in-time compiler selectively converts the optimized platform-independent intermediate representation associated with the method about to be called to platform-dependent code.

44. The apparatus of claim 43, wherein the selective conversion is based on at least one of memory usage during runtime, processor usage, user decision, or fuzzy logic.

45. A system for platform-independent selective ahead-of-time compilation, comprising:
- a method selector on a host and operable to select a subset of methods from bytecodes for ahead-of-time compilation, the method selector including a profiling tool operable to rank a set of methods according to predetermined criteria and a heuristic operable to identify the subset of methods from the set of methods, wherein the bytecodes are compiled from source codes prior to the ahead-of-time compilation;
- an ahead-of-time compiler on the host, the ahead-of-time compiler including a first unit and a second unit, the first unit operable to convert, for each selected method, the bytecodes corresponding to the selected method to a platform-independent intermediate representation, and the second unit operable to optimize the platform-independent intermediate representation of each selected method, wherein each of the optimized intermediate representations is stored with a corresponding selected method;
- a class preloader operable to load, prior to runtime, at least one of the selected methods onto a device for execution;
- a dynamic class loader operable to load, during runtime, at least one of the selected methods onto the device for execution;
- a virtual machine on a device, the virtual machine operable to receive at least one method from one of the class preloader and dynamic class loader;
- an interpreter on the device, the interpreter operable to access a method descriptor data structure of a method about to be called, and determine whether the method descriptor data structure has an optimized platform-independent intermediate representation associated with it; and
- a just-in-time compiler on the device, the just-in-time compiler operable to convert the optimized intermediate representation associated with the method about to be called to platform-dependent machine code based on a determination that the method descriptor data structure has an optimized platform-independent intermediate representation associated with it.

46. An apparatus for platform-independent selective ahead-of-time compilation, comprising:
- means for selecting a subset of methods from bytecodes for ahead-of-time compilation, wherein the bytecodes are compiled from source codes prior to the ahead-of-time compilation;
- means for converting, for each selected method, the bytecodes corresponding to the selected method to a platform-independent intermediate representation;
- means for optimizing the platform-independent intermediate representation of each selected method; and
- means for storing each of the optimized intermediate representations as one of a field of a corresponding method descriptor data structure and an attribute of the corresponding method descriptor data structure;
- means for loading at least one of the selected methods onto a device for execution by a virtual machine on the device, wherein the virtual machine accesses a method descriptor data structure associated with the at least one selected method, determines whether the at least one selected method has an optimized intermediate representation associated with it, and, based on a determination that the at least one selected method is associated with an optimized intermediate representation, converts the optimized intermediate representation associated with the at least one selected method to platform-dependent machine code.

47. The apparatus of claim 46, said means for selecting comprising:
- means for ranking a set of methods according to predetermined criteria; and
- means for identifying the subset of methods from the set of methods using a heuristic.

48. The apparatus of claim 47, wherein the means for ranking creates an ordered list of methods in the set of methods.

49. The apparatus of claim 46, wherein an optimized intermediate representation is stored as a field of a corresponding method descriptor data structure when the corresponding selected method is preloaded.

50. The apparatus of claim 46, wherein an optimized intermediate representation is stored as an attribute of a corresponding method descriptor data structure when the corresponding selected method is dynamically loaded.

51. The apparatus of claim 46, wherein the virtual machine determines whether the at least one selected method has a platform-independent intermediate representation associated with it by checking a flag in the associated method descriptor data structure.

52. The process of claim 46, wherein the virtual machine selectively converts the platform-independent intermediate representation associated with the at least one selected method to platform-dependent code.

53. The process of claim 52, wherein the selective conversion is based on at least one of memory usage during runtime, processor usage, user decision, or fuzzy logic.

54. A computer-readable storage medium containing instructions for performing a process for platform-independent selective ahead-of-time compilation in a system including a host and a device, the process comprising: selecting, by the host, a subset of methods from bytecodes for ahead-of-time compilation, wherein the bytecodes are compiled from source codes prior to the ahead-of-time compilation; converting, by the host, for each selected method, the bytecodes corresponding to the selected method to a platform-independent intermediate representation; optimizing, by the host, the platform-independent intermediate representation of each selected method; and storing each of the optimized intermediate representations as one of a field of a corresponding method descriptor data structure and an attribute of the corresponding method descriptor data structure; loading at least one of the selected methods onto the device for execution by a virtual machine on the device, wherein the virtual machine accesses a method descriptor data structure associated with the at least one selected method, determines whether the at least one selected method has an optimized intermediate representation associated with it, and, based on a determination that the at least one selected method is associated with an optimized intermediate representation, converts the optimized intermediate representation associated with the at least one selected method to platform-dependent machine code.

55. The computer-readable storage medium of claim 54, said selecting comprising: ranking a set of methods according to predetermined criteria; and identifying the subset of methods from the set of methods using a heuristic.

56. The computer-readable storage medium of claim 55, wherein the ranking includes creating an ordered list of methods in the set of methods.

57. The computer-readable storage medium of claim 54, wherein an optimized intermediate representation is stored as a field of a corresponding method descriptor data structure when the corresponding selected method is preloaded.

58. The computer-readable storage medium of claim 54, wherein an optimized intermediate representation is stored as an attribute of a corresponding method descriptor data structure when the corresponding selected method is dynamically loaded.

59. A computer-readable storage medium containing instructions for performing a process for platform-independent selective ahead-of-time compilation in a system including a host and a device, the process comprising: receiving at least one method from the host, wherein the method is from a subset of methods from bytecodes selected by the host for ahead-of-time compilation, wherein the bytecodes are compiled from source codes prior to the ahead-of-time compilation, and wherein the bytecodes corresponding to each selected method are converted by the host to a platform-independent intermediate representation, the platform-independent intermediate representation of each selected method is optimized by the host, and each of the optimized platform-independent intermediate representations is stored with a corresponding selected method; accessing, by a virtual machine on the device, a method descriptor data structure of a method about to be called; determining, by the virtual machine, whether the method descriptor data structure has an optimized platform-independent intermediate representation associated with it; and converting, by the virtual machine, the optimized intermediate representation associated with the at least one selected method to platform-dependent machine code based on a determination that the method descriptor data structure has an optimized platform-independent intermediate representation associated with it.

60. An apparatus for platform-independent selective ahead-of-time compilation in a system including a host and a device, comprising:
means for receiving at least one method from the host, wherein the method is from a subset of methods from bytecodes selected for ahead-of-time compilation, wherein the bytecodes are compiled from source codes prior to the ahead-of-time compilation, and wherein the bytecodes corresponding to each selected method are converted to a platform-independent intermediate representation, the platform-independent intermediate representation of each selected method is optimized, and each of the optimized platform-independent intermediate representations is stored with a corresponding selected method;
means for accessing a method descriptor data structure of a method about to be called;
means for determining whether the method descriptor data structure has an optimized platform-independent intermediate representation associated with it; and
means for converting the optimized intermediate representation associated with the at least one selected method to platform-dependent machine code based on a determination that the method descriptor data structure has an optimized platform-independent intermediate representation associated with it.

* * * * *